C. F. HARGRAVE.
COMPOSITE ROLLER.
APPLICATION FILED APR. 13, 1910.
979,666.
Patented Dec. 27, 1910.
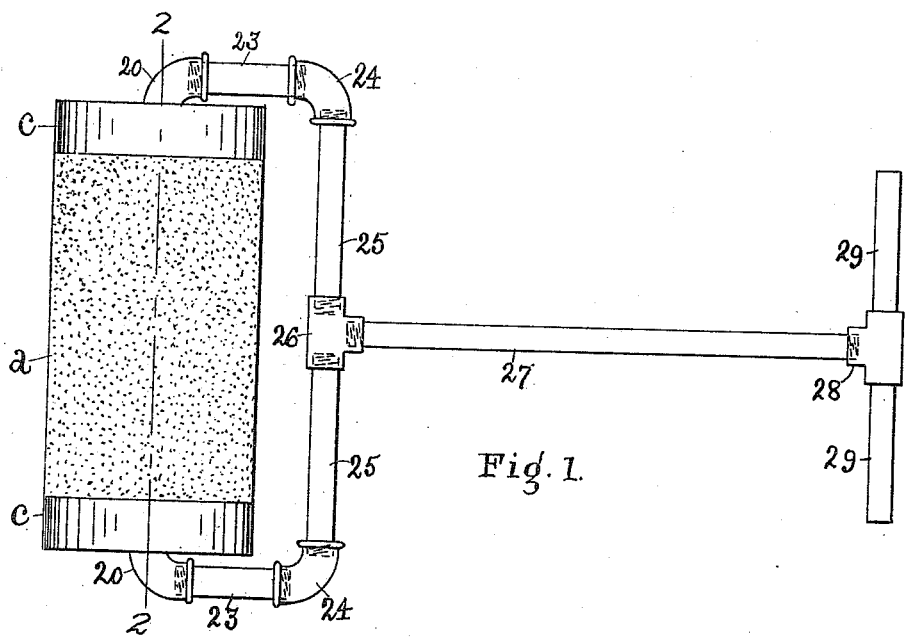
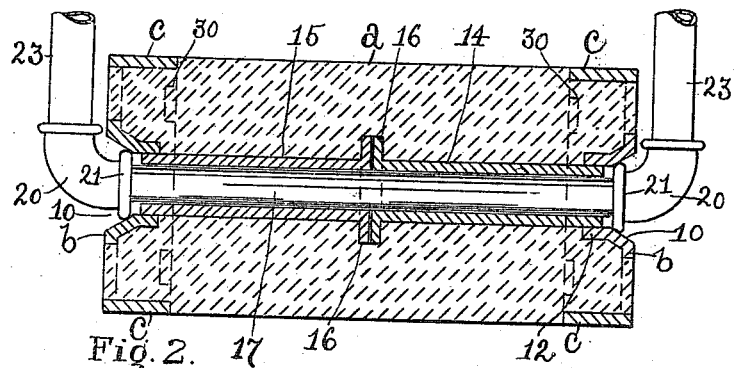
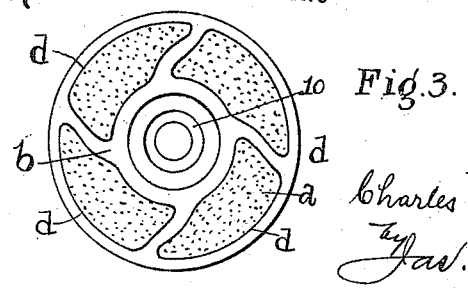
Witnesses.
Inventor.
Charles F. Hargrave

UNITED STATES PATENT OFFICE.

CHARLES F. HARGRAVE, OF WINTHROP, MASSACHUSETTS.

COMPOSITE ROLLER.

979,666.

Specification of Letters Patent. Patented Dec. 27, 1910.

Application filed April 13, 1910. Serial No. 555,178.

*To all whom it may concern:*

Be it known that I, CHARLES F. HARGRAVE, a citizen of the United States, residing in Winthrop, county of Suffolk, and State of Massachusetts, have invented an Improvement in Composite Rollers, of which the following description, in connection with the accompanying drawings, is a specification, like letters on the drawings representing like parts.

This invention relates to a composite roller especially designed and adapted among other uses to be employed as a lawn roller.

The invention has for its object to provide a simple, strong and efficient roller, which is provided with a handle of novel construction as will be described, and in which provision is made for enabling the side arms of the handle to be brought in close proximity to the ends of the roller, so as to enable the roller to be worked close up to walls, fences, steps and like objects, and which also provides for shedding water or moisture which may run down on the handle and preventing the same from entering the roller, as will be described.

These and other features of this invention will be pointed out in the claims at the end of this specification.

Figure 1 is a plan view of a roller embodying this invention. Fig. 2, a longitudinal section on the line 2—2, Fig. 1, and Fig. 3, a detail in end elevation to be referred to.

Referring to the drawing, *a* represents the cylindrical body of the roller, which is made of concrete or like non-metallic material to obtain lightness, and *b* are metal end disks, which are provided with circumferential flanges *c*, within which the concrete body *a* is molded, so that the exterior surface of the flanges *c* are flush or substantially flush with the outer circumference of the concrete body portion *a*. The metal end disks *b* may and preferably will be provided with openings *d* for the reception of the concrete, as clearly shown in Figs. 2 and 3.

The metal end disks *b* are provided with inwardly extended hubs comprising a conical or frustum-shaped portion 10 and a cylindrical portion 12. The conical portion 10 imparts a bell-shape to the inner surface of the hubs with the wider portion of the bell at the junction of the outer surfaces of the end disks for a purpose as will be described. The inner ends 12 of the hub have fitted tight within them the ends of metal tubes or sleeves 14, 15, each of a length substantially equal to one half of the length of the roller and each provided with a flange 16 at its inner end (see Fig. 2).

The metal sleeves 14, 15, have extended through them a tube or rod 17, which is threaded at its opposite ends to engage one end of metal elbows 20, having annular beads 21, preferably enlarged or made of a diameter, which will enable them to contact with or substantially contact with the conical inner walls 10 of the hubs within the same, as clearly shown in Fig. 2. The other ends of the elbows 20 are connected by pipe sections 23 forming side arms with elbows 24, which are joined by pipe sections 25 to a tee coupling 26, which is joined by a pipe section 27 to a tee coupling 28 from which extend pipe sections or rods 29. The metal handle thus formed is strong, light, and easily assembled and taken down, and by reason of the elbows 20 being extended into the conical hubs 10, the side arms of the handle may be brought close to the ends of the roller, which enables the latter to work close up to walls, steps, fences and the like. Furthermore, by the coöperation of the beads 21 on the elbows 20 with the conical hubs, any water or moisture, which may run down the side arms of the handle, runs off from the bead 21 onto the conical inner surface 10 of the hub, and is deflected away from the interior of the roller and prevented from entering within the same, thereby avoiding the formation of rust, which would render the roller harder to operate.

The tube or pipe 17 extended through the sleeves 14, 15, is made of substantially the internal diameter of said sleeves, so as to obtain a bearing for the rod substantially the length of the roller and thereby facilitate the operation of the same. The flanges *c* on the end disks may if desired be provided with inwardly extended lugs 30, which assist in locking the end disks to the concrete body *a*.

From the above description, it will be seen that the roller is strong, light, easily assembled and can be worked close up to the walls of buildings, fences, etc., and further is not liable to become hard to operate by rust within the body portion, as the liability of rust forming is reduced to a minimum, which enables the roller to be operated to advantage in moist weather.

Claims.

1. In a roller of the character described, in combination, a concrete body portion provided with metal end disks having inwardly extended hubs provided with conical inner surfaces, and a handle provided with elbows extended into said hubs and having beads coöperating with said conical surfaces, and a rod extended through said roller and connecting said elbows, substantially as described.

2. In a roller of the character described, in combination, a concrete body portion provided with metal end disks having inwardly extended hubs provided with conical inner surfaces, and a handle having side arms extended into said hubs and coöperating with said conical surfaces to cause moisture to be deflected by said conical surfaces to the outside of the said body portion, substantially as described.

3. In a roller of the character described, in combination, a concrete body portion provided with end disks having inwardly extended hubs provided with conical portions extended from the outer surfaces of the disks toward the center of the roller with the narrower end of said conical portions within the concrete body portion, a handle provided with side arms extended into said conical portions and provided with means coöperating therewith to cause moisture to be deflected outward to the ends of the roller, substantially as described.

In testimony whereof, I have signed my name to this specification in the presence of two subscribing witnesses.

CHARLES F. HARGRAVE.

Witnesses:
JAS. H. CHURCHILL,
J. MURPHY.